US012688186B2

(12) United States Patent (10) Patent No.: US 12,688,186 B2
Liu et al. (45) Date of Patent: Jul. 21, 2026

(54) EFFECTIVE AND EFFICIENT SUPPORT OF JSON DATATYPE COMPARISON

(71) Applicant: Oracle International Corporation, Redwood Shores, CA (US)

(72) Inventors: Zhen Hua Liu, San Mateo, CA (US); Douglas James McMahon, Redwood City, CA (US); Ying Lu, Sunnyvale, CA (US); Beda Christoph Hammerschmidt, Palo Alto, CA (US); Joshua Spiegel, St. Louis, MO (US); Hui Zhang, San Ramon, CA (US); Jose Luis Valera Lizarraga, Zapopan (MX)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/987,968

(22) Filed: Dec. 19, 2024

(65) Prior Publication Data

US 2025/0307239 A1    Oct. 2, 2025

Related U.S. Application Data

(60) Provisional application No. 63/573,378, filed on Apr. 2, 2024.

(51) Int. Cl.
*G06F 16/2452* (2019.01)
*G06F 16/21* (2019.01)
*G06F 16/25* (2019.01)

(52) U.S. Cl.
CPC ........ *G06F 16/2452* (2019.01); *G06F 16/212* (2019.01); *G06F 16/258* (2019.01)

(58) Field of Classification Search
CPC ... G06F 16/2452; G06F 16/212; G06F 16/258
See application file for complete search history.

(56) References Cited

U.S. PATENT DOCUMENTS

| | | | | |
|---|---|---|---|---|
| 10,437,564 | B1 * | 10/2019 | Periwal | G06F 8/315 |
| 11,334,592 | B2 * | 5/2022 | Sastry | G06F 16/951 |
| 2022/0014555 | A1 * | 1/2022 | Crabtree | H04L 63/1441 |
| 2022/0100747 | A1 * | 3/2022 | Mire | G06F 16/278 |
| 2024/0232131 | A1 * | 7/2024 | Crowell | G06F 16/258 |
| 2025/0094435 | A1 * | 3/2025 | Gurusamy | G06F 16/2471 |

* cited by examiner

*Primary Examiner* — Dangelino N Gortayo
(74) *Attorney, Agent, or Firm* — Hickman Becker Bingham Ledesma LLP

(57) ABSTRACT

Comparison and sorting of data stored according to a flexible schema data type is disclosed. A data object is accessed, the data object stored according to a set of one or more datatypes, wherein the set comprises a flexible schema datatype and data in the data object pertains to a plurality of domains. Data within the data object is translated to a sortable intermediate format that is configured to allow local ordering among elements in the respective plurality of domains while allowing global ordering among the plurality of domains based on a pre-selected convention. The translated data is stored in a storage system accessible by a database management system (DBMS). Structured query language (SQL) operations are performed on the stored translated data.

18 Claims, 5 Drawing Sheets

EFFECTIVE AND EFFICIENT SUPPORT OF JSON DATATYPE COMPARISON

BENEFIT CLAIM

This application claims the benefit under 35 U.S.C. § 119(e) of provisional application 63/573,378, filed Apr. 2, 2024, by Liu et al., the entire contents of which is hereby incorporated by reference. The applicant hereby rescinds any disclaimer of claim scope in the parent applications or the prosecution history thereof and advise the USPTO that the claims in this application may be broader than any claim in the parent application.

FIELD OF THE INVENTION

The present invention relates to analysis and evaluation of non-native data types. More particularly, the present invention relates to comparison and evaluation of data types to be ordered, sorted grouped, etc. in a relational database management system.

BACKGROUND

Relational database management systems (RDBMS) are based on static schema where structured query language (SQL) expressions operate on a fixed domain of data types (e.g., number varchar, dateTime, raw). Thus, if a column is of a fixed domain data type, range comparisons, ordering, and similar operations are well defined. However, with a flexible schema datatype (e.g., JavaScript Object Notation, or "JSON" datatype), operations such as group by, distinct, SET UNION, and difference are challenging semantically because data in a flexible schema datatype (e.g., JSON) do not have a fixed domain. For example, one JSON instance can be a scalar string and another JSON instance can be a JSON object. While the JSON/SQL standard specifies the ordering JSON types is implementation defined, it does not provide any useful semantics or guidance on the issue. Thus, no practical solution currently exists.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

Techniques are provided for translation of JSON datatypes to SQL-compatible datatypes that can be sorted and/or ordered. A data object is accessed, the data object stored according to a set of one or more datatypes, wherein the set comprises a flexible schema datatype and data in the data object pertains to a plurality of domains. Data within the data object is translated to a sortable intermediate format that is configured to allow local ordering among elements in the respective plurality of domains while allowing global ordering among the plurality of domains based on a pre-selected convention. The translated data is stored in a storage system accessible by a database management system (DBMS). Structured query language (SQL) operations are performed on the stored translated data.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

JSON Overview

JSON is an open standard file format and data interchange format that uses human-readable text to store and transmit data objects consisting of attribute-value pairs and arrays. JSON is a language-independent data format developed in the early 2000s. Internet Engineering Task Force (IETF) Request for Comments (RFC) 4627 provides further detail and specifies that JSON can represent four primitive types (strings, numbers, Booleans and null) and two structured types (objects and arrays). JSON is described in further detail in U.S. patent application Ser. No. 17/966,724, NATIVELY SUPPORTING JSON DUALITY VIEW IN A DATABASE MANAGEMENT SYSTEM, filed on Oct. 14, 2022 by Zhen Hua Liu, et al., the entire contents of which are hereby incorporated herein by reference, and in U.S. patent application Ser. No. 17/966,716, TECHNIQUES FOR COMPREHENSIVELY SUPPORTING JSON SCHEMA IN RDBMS, filed on Oct. 14, 2022 by Zhen Hua Liu, et al., the entire contents of which are hereby incorporated herein by reference.

Figure 1:
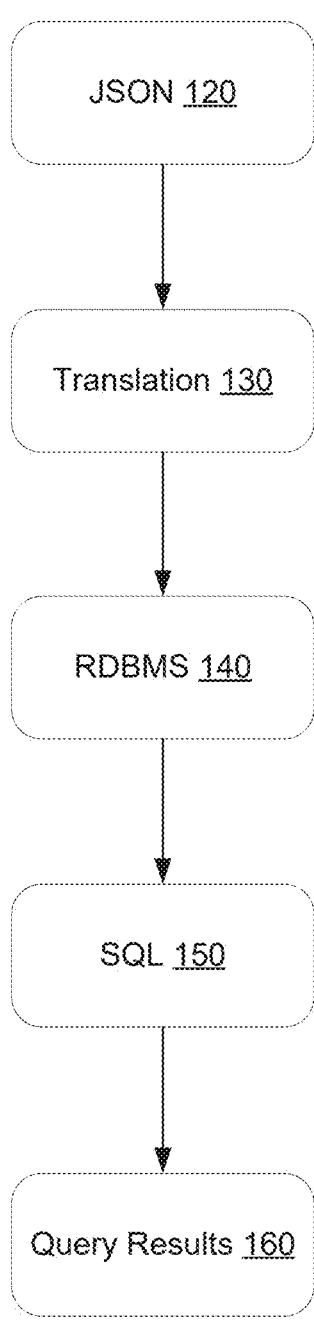
FIG. 1 provides a conceptual illustration of an approach to utilizing JSON datatypes in a SQL environment to generate query results.

As an overview, FIG. 1 provides a conceptual illustration of an approach to utilizing JSON datatypes in a SQL environment to generate query results. In an example, JSON file 120 can include any number of JSON datatypes to be translated. In an example, translation 130 receives JSON datatypes and performs a translation (or conversion) to a format suitable for use by relational database management system (RDBMS) 140. Various example approaches to translation are provided in greater detail below. After conversion, one or more SQL queries 150 can be performed to generate query results 160.

Returning to the JSON/SQL ordering issue, the JSON/SQL standard provides no specifics so sorting and ordering JSON has no precedence or expectations to follow. One approach is to use something like JSON_VALUE (data, '$.person.salary', returning number) as a way to extract scalar data out of a JSON datatype as a fixed domain type to do ordering of the fixed domain type. However, providing ordering by extracting JSON objects out of JSON datatypes such as JSON_QUERY (data, '$.person.address'), is chal-
lenging because the JSON object itself is a JSON datatype.
So, although JSON_QUERY (data, '$.person.address'
returning varchar2(4000)) is syntactically valid, it is seman-
tically not very useful because ordering the address by its
textual value is particularly useful. This is because, for
example, the Boolean value 'true' and the string value
'"true"' are two different values but the conversion to a
varchar makes them indistinguishable. Other similar prob-
lems also exist.

Thus, a new and more effective approach is described
herein to provide a solution to the issues set forth above. As
described in the context of various examples below, con-
ceptually, the approach is based on dividing JSON datatypes
into domain buckets and providing local ordering among
elements in the same domain bucket while providing global
ordering among domain buckets based on a pre-selected
convention. Currently, JSON has only scalar nodes, object
nodes and array nodes and can therefore be divided into
three buckets. In an example, the following priority is
utilized: 1) scalar node; 2) object node; 3) array node.

In an example, a scalar node can be null, Boolean, string,
number domain buckets using original JSON definitions and
date/time domain, binary, interval domain using extended
JSON definitions, etc. In an example, because JSON objects
are based on hash table semantics, field names are ordered
within the JSON object. When field names are the same, the
ordering can be based on the value of the field, which is a
JSON datatype, recursively. In an example, array nodes are
ordered according to the array value, which is a JSON
datatype, recursively. In an example, the functionality asso-
ciated with the approach described herein the compilation
and ordering of JSON datatypes can be exposed via a custom
SQL function (referred to herein as "JSON_COMPARE",
however, the specific names and labels are not required to be
exactly as described).

Ordering of JSON Datatypes

In an example, to provide efficient ordering of JSON
datatypes, a memcomparable (memcomp) format of a JSON
datatype (referred to herein as "JSON_SORTABLE" format)
is provided that is, as an example, a RAW byte serialization
of JSON datatypes is memcomp-compatible. In general, if
something is "memcomparable" or "memcomp-compatible"
two items can have their corresponding values compared by
using a memcomp function. Thus, a memcomp-compatible
format (or memcomp serialization format) allows for com-
parison using a well-known memcomp function. In general,
a memcomp function returns a negative integer, zero or
positive integer depending on whether the first N characters
of a first object are less than, equal to, or greater than the first
N characters of a second object.

Thus, the approach described allows for comparison (and
thus ordering) of JSON datatype values by comparing
contiguous bytes of memory. Improved efficiencies can be
achieved by being able to access hardware efficiencies (e.g.,
prefetches) and other improvements. The result can be
orders of magnitude faster than other approaches (e.g.,
recursive deep-equals tree) that require greater processing
and memory resources. This results in increased system
efficiency, which can also result in decreased carbon foot-
print/environmental impact as well as other benefits.

The performance improvements associated with the mem-
comp-compatible format can improve index lookups and
therefore improve overall system performance. Further, the
use of the memcomp-compatible formats can enable
RDBMS users to build indexes over heterogenous datatype
collections that RDBMS designs generally do not cover.

As described in greater detail below, a SQL operator can
be provided that converts JSON datatypes to a JSON_SORT-
ABLE format that can look like, for example, JSON_VAL-
UE(data, '$' returning RAWCOMPARE). In an example, the
SQL compiler can internally apply the operator to the JSON
datatype to do, for example, a range comparison, an order
by, a group by, a distinct, a set UNION/DIFFERENCE, etc.
In an example, the JSON_SORTABLE format can also be
used as index keys in both single-value and multi-value
functional indices to support range comparison of JSON
datatypes.

In an example, the RAWCOMPARE functionality can be
hidden from a user because the query compiler can be
configured that, if a user query involves a comparison, order
by, group by, range compare (or similar) clause, the compiler
can add the functionality at compile time. In an example,
subsequent executions of the same query will reuse the
query from the cache such that this analysis is not repeated
for each execution.

In contrast to the approaches described herein, most
RDBMS leverage platform specific domain type support to
accomplish range comparisons. This relies on a (user or
system defined) call back function that traverses the input
data and checks for equality, which is inefficient and does
not leverage processor comparison capabilities. The
approaches described herein use memcompare (or compa-
rable) forms for SQL scaler datatypes so that they are
platform independent, and sortable via memcompare func-
tions without a platform specific datatype switch. Further,
the approaches described herein simplify ordering logic in
the SQL engine, and these efficiency gains improve, for
example, B+ tree index use where many values are com-
pared quickly and efficiently in order to access the correct
leaf node. Thus, conceptually, the approaches described
extend SQL scalar type memcompare functionality to JSON
datatypes.

JSON Format Conversion and SQL Operators

In an example, an SQL operator can be provided to
convert JSON datatypes to the JSON_SORTABLE format
and returned as SQL RAW( ). The SQL compiler can use this
JSON_SORTABLE operator for range comparisons of the
JSON datatype, order by, group by, distinct, UNION, DIF-
FERENCE, etc. In an example (described in greater detail
below), a multiple value functional index syntax is defined
to support indexing using the JSON_SORTABLE format.
For example, operations such as:

SQL/JSON json_exists(type(strict))
and
json_value (type(strict))

can use the JSON_SORTABLE format based muti-value
functional index.

In an example, a single value function index over the
JSON datatype is feasible by automatically using the SQL
operator that generates the JSON_SORTABLE format. In an
example, IS JSON_SORTABLE(raw(length)) can be
exposed so that users can detect if the JSON sortable form
can fit into the required RAW length bytes. While some of
the examples described herein are based on Oracle environ-
ments, the concepts and approaches are equally applicable in
other environments that utilize SQL or similar.

In an example, the various domain buckets have corre-
sponding byte codes so that the data types are grouped and
sorted in a predictable manner. For example, numbers can be
ordered before strings, which are ordered before objects,
which are ordered before arrays. In this example, numbers
can have a first byte code (e.g., 0x01), strings can have a
second byte code (e.g., 0x02), objects can have a third byte code (e.g., 0x03), arrays can have a fourth byte code (e.g., 0x04), etc. The byte code can be a prefix in the JSON_SORTABLE format.

In an example, when sorting strings, each character can be evaluated based on its corresponding UTF-8 encoding, which is memcomp-friendly by default. UTF refers to the Unicode Transformation Format, which is an algorithmic mapping from every Unicode code point to a unique byte sequence. There are several possible representations of Unicode data including, for example, UTF-8, UTF-16, UTF-32. For the examples described herein, UTF-8 is used; however, other representations can also be used in alternative configurations. UTF-8 is described in detail in RFC 3629: UTF-8, a transformation of ISO 10646, published November 2003 by The Internet Engineering Task Force (ITEF).

Thus, for a set of strings:
cat
dog
dög
catalog
dug
cúte
would be ordered:
cat
catalog
cúte
dog
dug
dög
when sorting/ordering using the UTF-8 encoding where shorter strings (e.g., "cat") are sorted before longer strings that match the characters of the shorter string (e.g., "catalog"). In some examples, a terminator can be used with strings.

In an example, numbers are ordered according to canonical numeric binary format, which is a memcomp-friendly format. Similarly, dates, timestamps and similar values are also sorted according to canonical numeric binary format with a selected time zone reference, for example, Coordinated Universal Time (UTC). In an example, raw data can be ordered using canonical numeric binary format when monitoring for length, which can be accomplished with a terminator (similar to strings discussed above).

In an example, numbers in various formats (e.g., DOUBLE, FLOAT, INTEGER, LONG INTEGER, DECIMAL128) are converted to a preselected format, for example, Oracle Number (or "ORNUM"). Optional extensions may be added to the preselected format if necessary. While ORNUM is used as an example, any other format having the necessary characteristics to manage available number formats can be used. Once converted, the numbers can be sorted according to canonical numeric binary format, which is memcomp-friendly.

In an example, like much of the ordering discussed above, for arrays shorter is lower in the order and the first difference between arrays determines the order. For example, the following arrays:
[1,3,4]
[1,2,3,4,5]
[1,2]
is sorted as:
[1,2]
[1,2,3,4,5]
[1,3,4].

In an example, when ordering binary values, the full range of byte codes (e.g., 0-255) are in use. In an example, binary values may be padded with a prefix value indicating the size of the padding. For example:
<rounded length 16>ABCD000000000
<rounded length 16>DEADBEEF00000
<rounded length 16>FFFF000000000
<rounded length 4096>FFFF00000000 . . . .

In example, when sorting fields containing values, the fields are sorted first into a canonical ordering (e.g., alphabetical) and then the contents of the fields are sorted field-by-field, where absence of a field sorts lower. For example:
"address": "1313 Mockingbird Lane, Bel Air, CA"
"address": {"street": "123 Main", "city": "Belmont"}
would be sorted differently because the first is an address field storing a complete address and the second address includes individual fields (e.g., street, city). Thus, in an example, the first type of address would be sorted in a canonical ordering (e.g., alphabetical) based on the full address and the second type of address would have fields sorted (e.g., "city" before "street") and the individual fields would be sorted (e.g., sort by city and then by street within each city).

By using the translation and ordering approaches (e.g., 130 in FIG. 1) described above, the JSON datatypes are converted to formats that can be used by a relational database management system (e.g., RDBMS 140 in FIG. 1).

Figure 2:
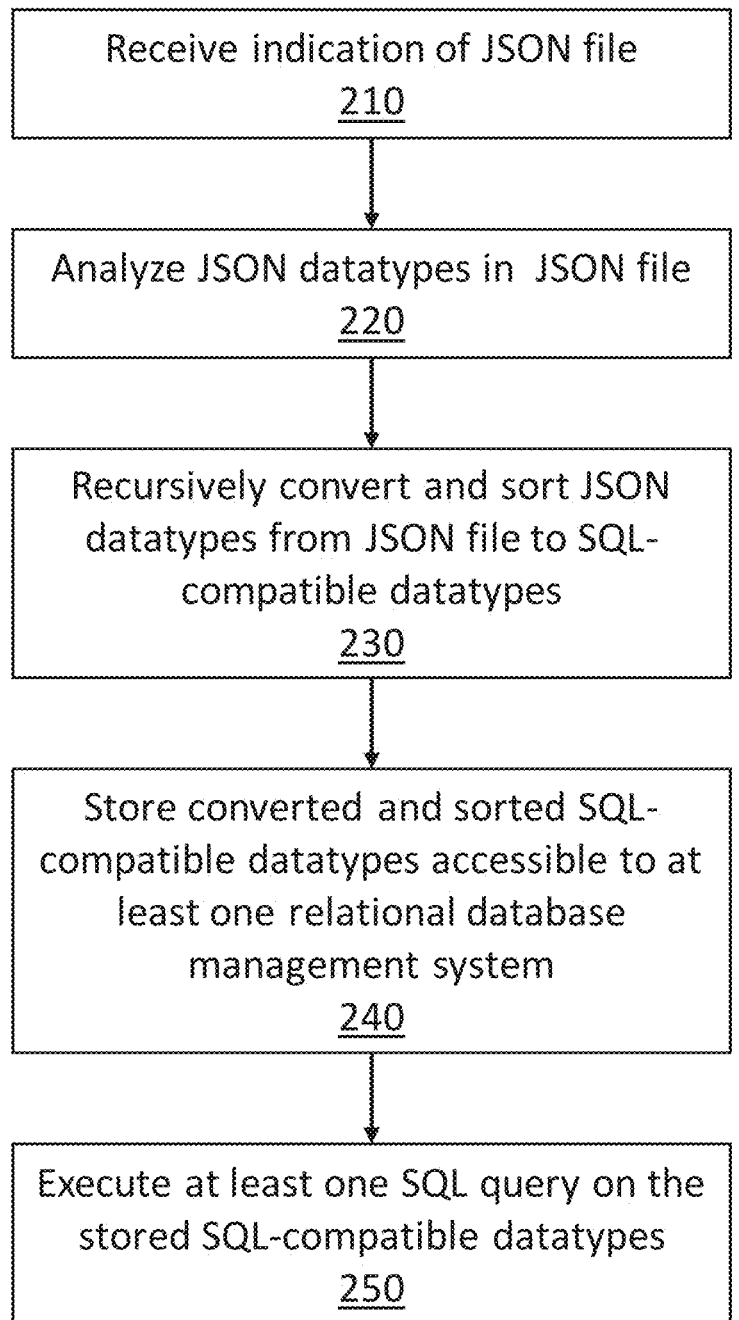
FIG. 2 is a flow diagram of an example translation from JSON datatypes to formats suitable for use in a relational database management system (RDBMS)

FIG. 2 is a flow diagram of an example translation from JSON datatypes to formats suitable for use in an RDBMS. In an example, the functionality described with respect to FIG. 2 can be provided by a computer system, one example of which is provided in FIG. 4. Instructions to be executed to provide the functionality described with respect to FIG. 2 can be stored in, for example, storage device 410 and/or main memory 406. Further, instructions to be executed to provide the functionality described with respect to FIG. 2 can be received via, for example, communication interface 418 prior to being stored by computer system 400.

In an example, an indication of a JSON file to be processed is received, 210. The JSON file includes one or more JSON datatypes to be processed as described herein. The indication can be received, for example, as user input via a graphical user interface (GUI), as part of a SQL statement (e.g., JSON_COMPARE), etc. In response to receiving the indication of the JSON file, the JSON file is accessed.

The JSON datatypes in the designated JSON file are analyzed, 220. In an example, the various JSON datatypes within the designated file are identified to be translated as described. In an example, a IS JSON_SORTABLE(raw (length)) or similar operation can be used.

The JSON datatypes are recursively converted and/or sorted, 230, for example, as described above. That is, the JSON datatypes are converted to memcomp-compatible formats and are ordered using memcomp (or comparable) operations. In an example, the JSON datatypes are translated to corresponding JSON_SORTABLE format data and returned via one or more SQL RAW( ) operations (or comparable operations). At this point the datatypes are SQL-compatible.

The translated datatypes are stored on a storage device that is accessible to at least one relational database management system (RDBMS), 240. In an example, the translated datatypes are stored in the RDBMS. In another example, translated datatypes can be stored in storage device external to, but accessible by, the RDBMS. At least one SQL query is executed against the stored data, 250.

Figure 3:
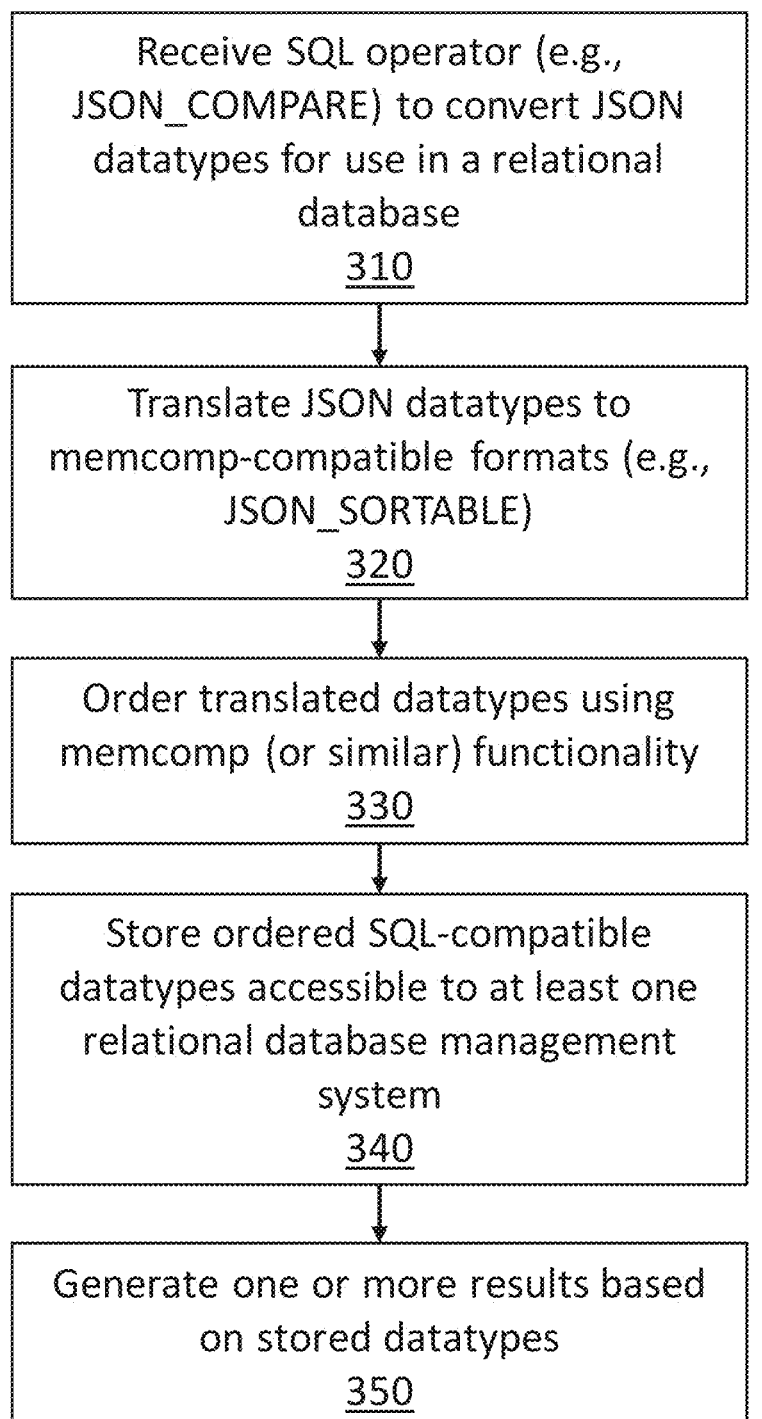
FIG. 3 is a flow diagram of an example conversion of JSON datatypes in response to a SQL operation.

FIG. 3 is a flow diagram of an example conversion of JSON datatypes in response to a SQL operation. In an example, the functionality described with respect to FIG. 3 can be provided by a computer system, one example of which is provided in FIG. 4. Further, instructions to be executed to provide the functionality described with respect to FIG. 3 can be received via, for example, communication interface 418 prior to being stored by computer system 400.

In an example, a RDBMS can receive an SQL operation (e.g., JSON_COMPARE) to initiate translation of one or more JSON datatypes for use in a SQL-compliant database environment. In an example, various JSON datatypes within the designated file are identified to be translated as described above. In an example, a IS JSON_SORTABLE(raw(length)) or similar operation can be used.

The identified JSON datatypes are translated to memcomp-compatible formats (e.g., JSON_SORTABLE), 320, using, for example, the approaches described above. The translated datatypes are ordered using a memcomp-compatible (or similar) ordering operation, 330.

The ordered SQL-compatible datatypes are stored on a storage device that is accessible to at least one RDBMS, 340. In an example, the ordered SQL-compatible datatypes are stored in the RDBMS. In another example, the ordered SQL-compatible datatypes can be stored in storage device external to, but accessible by, the RDBMS. At least one query is executed against the stored data to generate at least result, 350.

Database Overview

Embodiments of the present invention are used in the context of database management systems (DBMSs). Therefore, a description of an example DBMS is provided. Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

Users interact with a database server of a DBMS by submitting to the database server commands that cause the database server to perform operations on data stored in a database. A user may be one or more applications running on a client computer that interact with a database server. Multiple users may also be referred to herein collectively as a user.

Metadata Definitions

A database comprises data and a database dictionary that is stored on a persistent memory mechanism, such as a set of hard disks. A database is defined by its own separate database dictionary. A database dictionary comprises metadata that defines database objects contained in a database. In effect, a database dictionary defines much of a database. Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object. A database dictionary is referred to by a DBMS to determine how to execute database commands submitted to a DBMS. Database commands can access the database objects that are defined by the database dictionary.

Database Operation

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, such as Oracle Database 11g. SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

A multi-node database management system is made up of interconnected nodes that share access to the same database. Typically, the nodes are interconnected via a network and share access, in varying degrees, to shared storage, such as with shared access to a set of disk drives and data blocks stored thereon. The nodes in a multi-node database system may be in the form of a group of computers, such as work stations and/or personal computers, that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Query Processing

A query is an expression, command, or set of commands that, when executed, causes a server to perform one or more operations on a set of data. A query may specify source data object(s), such as table(s), column(s), view(s), or snapshot(s), from which result set(s) are to be determined. For example, the source data object(s) may appear in a FROM clause of a Structured Query Language ("SQL") query. SQL is a well-known example language for querying database objects. As used herein, the term "query" is used to refer to any form of representing a query, including a query in the form of a database statement and any data structure used for internal query representation. The term "table" refers to any source object that is referenced or defined by a query and that represents a set of rows, such as a database table, view, or an inline query block, such as an inline view or subquery.

The query may perform operations on data from the source data object(s) on a row by-row basis as the object(s) are loaded or on the entire source data object(s) after the object(s) have been loaded. A result set generated by some operation(s) may be made available to other operation(s), and, in this manner, the result set may be filtered out or narrowed based on some criteria, and/or joined or combined with other result set(s) and/or other source data object(s).

A subquery is a portion or component of a query that is distinct from other portion(s) or component(s) of the query and that may be evaluated separately (i.e., as a separate query) from the other portion(s) or component(s) of the query. The other portion(s) or component(s) of the query may form an outer query, which may or may not include other subqueries. A subquery nested in the outer query may be separately evaluated one or more times while a result is computed for the outer query.

Generally, a query parser receives a query statement and generates an internal query representation of the query statement. Typically, the internal query representation is a set of interlinked data structures that represent various components and structures of a query statement.

The internal query representation may be in the form of a graph of nodes, each interlinked data structure corresponding to a node and to a component of the represented query statement. The internal representation is typically generated in memory for evaluation, manipulation, and transformation.

Query Optimization Overview

Query transformation is a set of techniques used by an optimizer to rewrite a query for optimization. A query rewrite technique may rewrite a representation of a query from one form to another form as long as the two forms are semantically equivalent to each other. The representation of the query may be the query expression or code itself or may be an internally and/or externally recognized representation of the query, such as a query execution tree or other data structure. If the representation does not include the query expression itself, the representation may include data that describes processes that may be performed to execute the query, such as a query execution plan (QEP). A QEP is a set of directives and metadata that is prepared for an execution engine.

As used herein, a query representation is "rewritten" when the representation represents a rewritten version of the query, after the query has been rewritten from a first version to a second version. A first version may be an original query or may be another version rewritten from the original query. Two query representations are semantically equivalent to each other when the two query representations, if executed, would produce equivalent result sets, even if the result sets are assembled in different manners by the two query representations.

Query Optimization and Execution Plans

When a database server receives the original statement of a database command, the database server must first determine which actions should be performed to execute the database command, and then perform those actions. The act of preparing for performance of those actions is generally referred to as "compiling" the database command, while performing those actions is generally referred to as "executing" the database command. During the compilation of a query statement, the database server may perform a significant amount of preliminary work for the statement, such as parsing, semantic analysis, and execution plan generation.

A database command submitted to a database server goes through a query compilation phase where the database command is parsed and optimized. Query optimization selects an optimal execution plan which is then passed on to a query execution engine as a query execution plan to be executed during runtime.

Query optimization generates one or more different candidate execution plans for a database command, which are evaluated by the query optimizer to determine which execution plan should be used to compute the query.

Execution plans may be represented by a graph of interlinked nodes, referred to herein as operators or row sources, that each corresponds to a step of an execution plan, referred to herein as an execution plan operation. The hierarchy of the graphs (i.e., directed tree) represents the order in which the execution plan operations are performed and how data flows between each of the execution plan operations. An execution plan operator generates a set of rows (which may be referred to as a table) as output and execution plan operations include, for example, a table scan, an index scan, sort-merge join, nested-loop join, filter, a full outer join, and importantly, a partial group by operator.

A query optimizer may optimize a database command by transforming the database command. In general, transforming a data command involves rewriting a database command into another semantically equivalent database command that should produce the equivalent result and that can potentially be executed more efficiently, i.e. one for which a potentially more efficient and less costly execution plan can be generated. Examples of query transformations include view merging, subquery unnesting, predicate move-around and push-down, common subexpression elimination, outer-to-inner join conversion, materialized view rewrite, and star transformation.

Hardware Overview

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
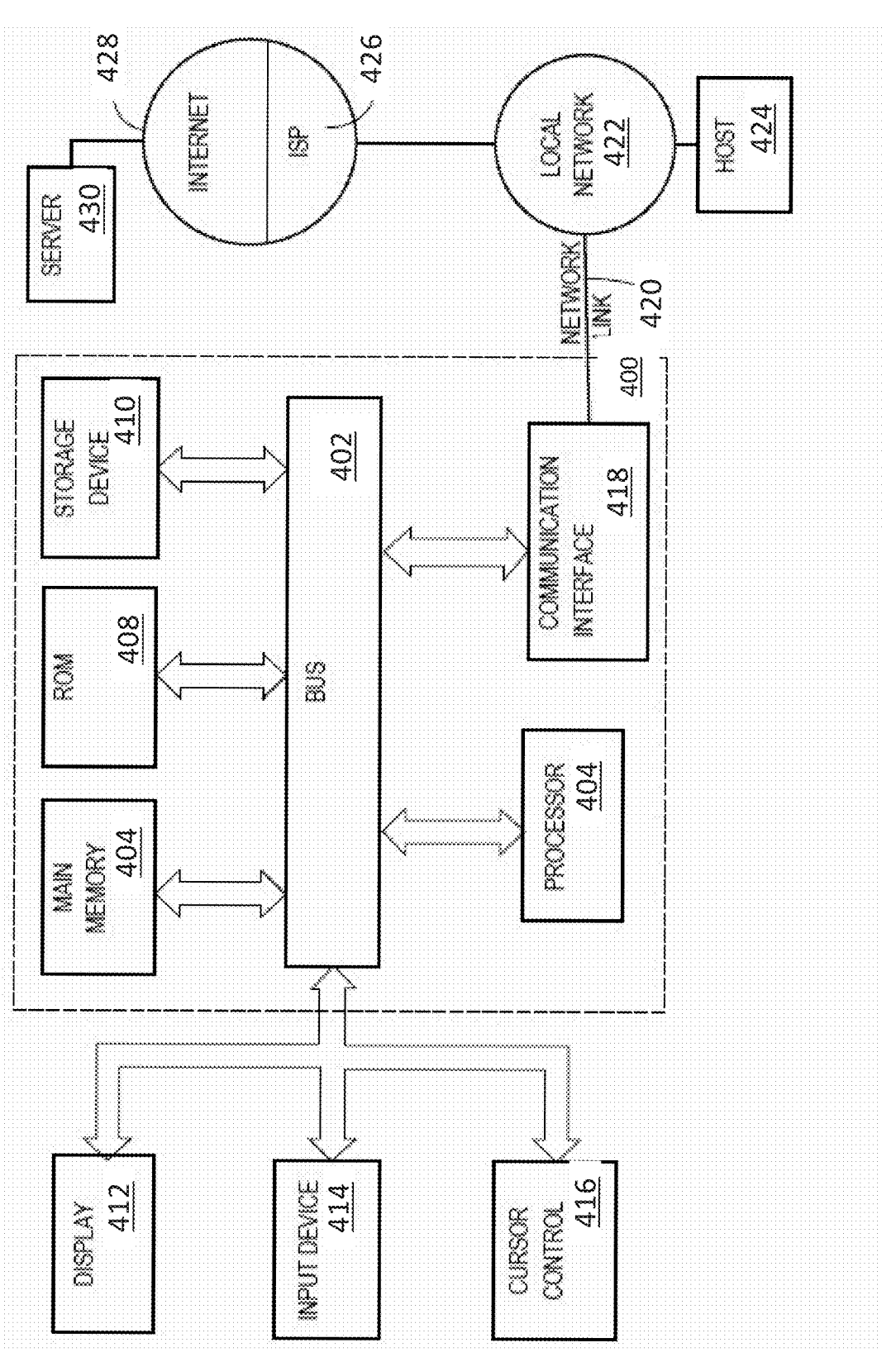
FIG. 4 is a block diagram that illustrates a computer system upon which an embodiment of the invention may be implemented.

For example, FIG. 4 is a block diagram that illustrates computer system 400 upon which various embodiments may be implemented. Computer system 400 includes bus 402 or other communication mechanism for communicating information, and hardware processor 404 coupled with bus 402 for processing information. Hardware processor 404 may be, for example, a general-purpose microprocessor.

Computer system 400 also includes a main memory 406, such as a random-access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404 including, for example, instructions to execute the functionality described with respect to FIG. 2 and/or FIG. 3. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to network link 420 that is connected to local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to host computer 424 or to data equipment operated by Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, server 430 might transmit a requested code for an application program through Internet 428, ISP 426, local network 422 and communication interface 418.

The received code may be executed by processor 404 as it is received, and/or stored in storage device 410, or other non-volatile storage for later execution.

Software Overview

Figure 5:
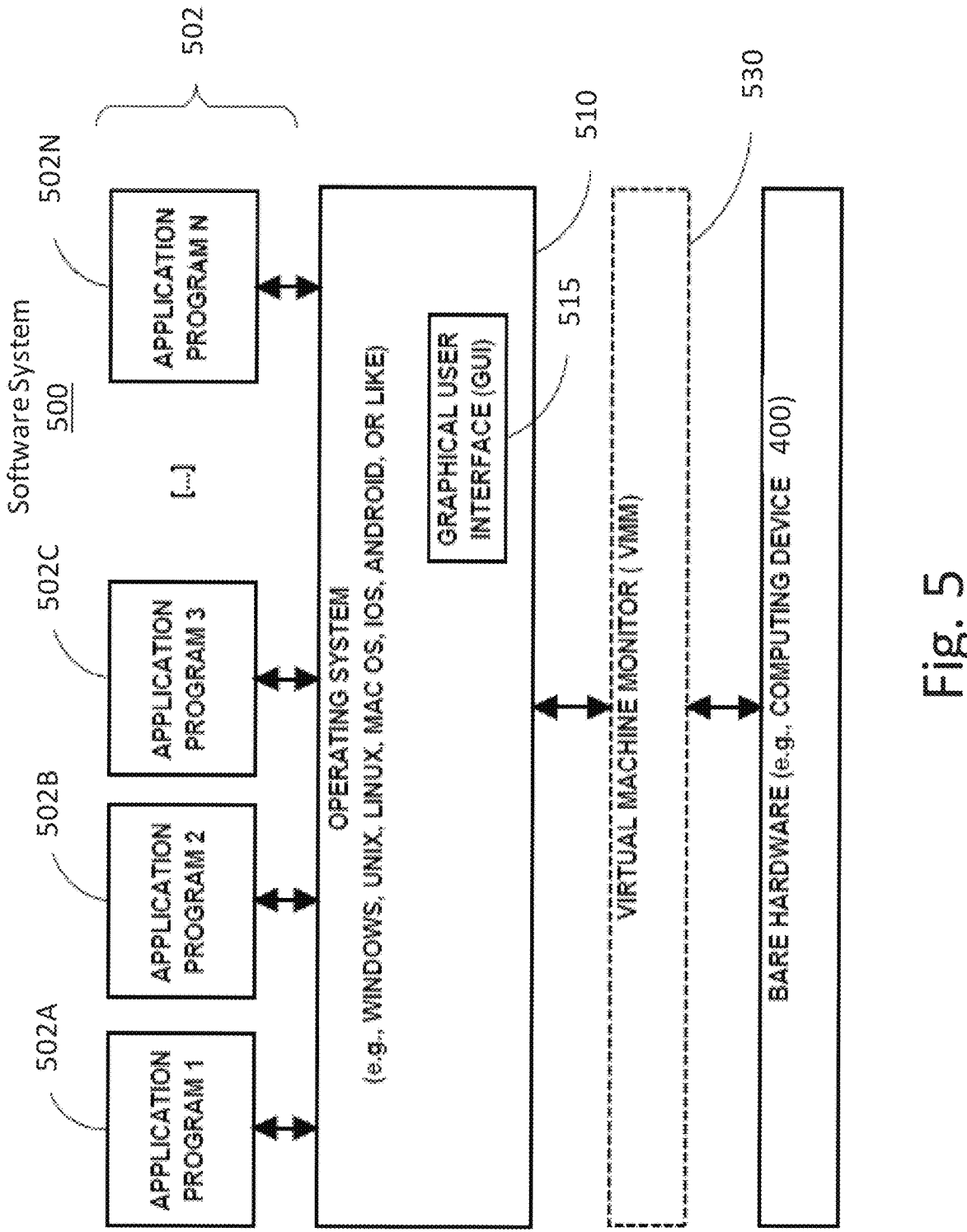
FIG. 5 is a block diagram that illustrates a basic software system that may be employed for controlling the operation of a computing system.

FIG. 5 is a block diagram of basic software system 500 that may be employed for controlling the operation of computing system 500. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 500. Software system 500, which may be stored in system memory (RAM) 506 and on fixed storage (e.g., hard disk or flash memory) 510, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 510 into memory 506) for execution by the system 500. The applications or other software intended for use on computer system 500 may also be stored as a set of downloadable computer-executable instructions, for example, for downloading and installation from an Internet location (e.g., a Web server, an app store, or other online service).

Software system 500 includes graphical user interface (GUI) 515, for receiving user commands and data in a graphical (e.g., "point-and-click" or "touch gesture") fashion. These inputs, in turn, may be acted upon by system 500 in accordance with instructions from operating system 510 and/or application(s) 502. GUI 515 also serves to display the results of operation from OS 510 and application(s) 502, whereupon the user may supply additional inputs or terminate the session (e.g., log off).

OS 510 can execute directly on the bare hardware 520 (e.g., processor(s) 504) of computer system 500. Alternatively, a hypervisor or virtual machine monitor (VMM) 530 may be interposed between the bare hardware 520 and OS 510. In this configuration, VMM 530 acts as a software "cushion" or virtualization layer between OS 510 and bare hardware 520 of computer system 500.

VMM 530 instantiates and runs one or more virtual machine instances ("guest machines"). Each guest machine comprises a "guest" operating system, such as OS 510, and one or more applications, such as application(s) 502, designed to execute on the guest operating system. VMM 530 presents the guest operating systems with a virtual operating platform and manages the execution of the guest operating systems.

In some instances, VMM 530 may allow a guest operating system to run as if it is running on bare hardware 520 of computer system 500 directly. In these instances, the same version of the guest operating system configured to execute on bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/ private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

CONCLUSION

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

15                                                                16

What is claimed is:

1. A method comprising:

accessing a data object stored according to a set of one or more datatypes, wherein the set comprises a flexible schema datatype and data in the data object pertains to a plurality of domains;

translating data within the data object stored according to the flexible schema datatype to a sortable intermediate format that is configured to allow local ordering among elements in the respective plurality of domains while allowing global ordering among the plurality of domains based on a pre-selected convention;

wherein the local ordering is based on a raw byte serialization of the data using a MEMCOMPARABLE ("MEMCOMP") format to allow byte-by-byte comparisons between values depending on whether the first N characters of a first object are less than, equal to, or greater than the first N characters of a second object;

storing the translated data in a storage system accessible by a database management system (DBMS);

performing one or more structured query language (SQL) operations on the stored translated data; and wherein the method is performed by one or more computing devices.

2. The method of claim 1 wherein the flexible schema datatype comprises a JavaScript Object Notation (JSON)-compliant datatype.

3. The method of claim 1 wherein the pre-selected convention comprises following a priority of: 1) scalar node; 2) object node; 3) array node.

4. The method of claim 1 wherein the one or more SQL operations utilize the local ordering and the global ordering.

5. The method of claim 1 wherein the local ordering is based on evaluation of each character based on its corresponding Unicode Transformation Format-8 (UTF-8) encoding.

6. The method of claim 1 wherein storing the translated data in a storage system accessible by the DBMS comprises storing the translated data in a table in a database managed by the DBMS.

7. The method of claim 6 wherein results from the one or more structured query language (SQL) operations on the stored translated data comprises at least query results from the translated data in the table in the database managed by the RDBMS.

8. The method of claim 1 wherein the translating of the data stored according to the flexible schema datatype to the sortable intermediate format comprises performing a recursive translation of multiple objects according to the flexible schema datatype.

9. The method of claim 1, wherein the global ordering is based on assigning a predetermined byte code prefix for each of the plurality of domains.

10. One or more non-transitory storage media storing instructions that, when executed by one or more computing devices, cause:

accessing a data object stored according to a set of one or more datatypes, wherein the set comprises a flexible schema datatype and data in the data object pertains to a plurality of domains;

translating data within the data object stored according to the flexible schema datatype to a sortable intermediate format that is configured to allow local ordering among elements in the respective plurality of domains while allowing global ordering among the plurality of domains based on a pre-selected convention;

wherein the local ordering is based on a raw byte serialization of the data using a MEMCOMPARABLE ("MEMCOMP") format to allow byte-by-byte comparisons between values depending on whether the first N characters of a first object are less than, equal to, or greater than the first N characters of a second object;

storing the translated data in a storage system accessible by a database management system (DBMS); and performing one or more structured query language (SQL) operations on the stored translated data.

11. The one or more non-transitory storage media of claim 10 wherein the flexible schema datatype comprises a JavaScript Object Notation (JSON)-compliant datatype.

12. The one or more non-transitory storage media of claim 10 wherein the pre-selected convention comprises following a priority of: 1) scalar node; 2) object node; 3) array node.

13. The one or more non-transitory storage media of claim 10 wherein the one or more SQL operations utilize the local ordering and the global ordering.

14. The one or more non-transitory storage media of claim 10 wherein the local ordering is based on evaluation of each character based on its corresponding Unicode Transformation Format-8 (UTF-8) encoding.

15. The one or more non-transitory storage media of claim 10 wherein storing the translated data in a storage system accessible by the DBMS comprises storing the translated data in a table in a database managed by the DBMS.

16. The one or more non-transitory storage media of claim 15 wherein results from the one or more structured query language (SQL) operations on the stored translated data comprises at least query results from the translated data in the table in the database managed by the RDBMS.

17. The one or more non-transitory storage media of claim 10 wherein the translating of the data stored according to the flexible schema datatype to the sortable intermediate format comprises performing a recursive translation of multiple objects according to the flexible schema datatype.

18. The one or more non-transitory storage media of claim 10, wherein the global ordering is based on assigning a predetermined byte code prefix for each of the plurality of domains.

*     *     *     *     *